(12) United States Patent
Jeong

(10) Patent No.: US 7,776,990 B1
(45) Date of Patent: Aug. 17, 2010

(54) METHOD FOR PREPARING POLYSILAZANE SOLUTION WITH REDUCING AMMONIA SUBSTITUTION OF SI-H BOND

(75) Inventor: Eun Chang Jeong, Incheon (KR)

(73) Assignee: Stahnek Co., Ltd. (KR)

( * ) Notice: Subject to any disclaimer, the term of this patent is extended or adjusted under 35 U.S.C. 154(b) by 0 days.

(21) Appl. No.: 12/549,333

(22) Filed: Aug. 27, 2009

(30) Foreign Application Priority Data

Feb. 16, 2009 (KR) ...................... 10-2009-0012384

(51) Int. Cl.
*C08G 77/04* (2006.01)
(52) U.S. Cl. .............................. 528/28; 528/12; 528/31
(58) Field of Classification Search ................ 528/28
See application file for complete search history.

(56) References Cited

U.S. PATENT DOCUMENTS 4,659,850 A * 4/1987 Arai et al. .................... 556/409
6,310,168 B1 * 10/2001 Shimizu et al. ............... 528/28

* cited by examiner

*Primary Examiner*—Randy Gulakowski
*Assistant Examiner*—Lindsay Nelson
(74) *Attorney, Agent, or Firm*—Martine Penilla & Gencarella, LLP

(57) ABSTRACT

The present disclosure relates to a method of preparing polysilazane and a polysilazane solution which can minimize substitution of an Si—H bond of a starting compound by ammonia. Particularly, a method of synthesizing polysilazane using a solution which undergoes phase separation and a method of preparing a polysilazane solution for a wafer are disclosed. The method of preparing polysilazane using halosilane and liquid anhydrous ammonia includes adding liquid anhydrous ammonia to a solvent in a weight ratio of 0.5:1 to 10:1, followed by stirring to prepare a mixture solution, and allowing pseudo-ammonolysis to be carried out by adding halosilane to the mixture solution separated into two phases.

4 Claims, No Drawings

METHOD FOR PREPARING POLYSILAZANE SOLUTION WITH REDUCING AMMONIA SUBSTITUTION OF SI-H BOND

CLAIM OF PRIORITY

The present application is claiming priority of Korean Patent Application No. 10-2009-0012384, filed on Feb. 16, 2009, the content of which is incorporated herein by reference.

BACKGROUND OF THE INVENTION

1. Field of the Invention

The present invention relates to a method of preparing polysilazane and a polysilazane solution which can minimize substitution of a silicon-hydrogen bond (hereinafter, an "Si—H bond") of a starting compound using ammonia and, more particularly, to a method of synthesizing polysilazane using a solution which undergoes phase separation and a method of preparing a polysilazane solution for a wafer.

2. Description of the Related Art

Polysilazane, also referred to as polymeric silazane, is a polymer having a unit of —(SiR$_2$—NR)— and is dissolved in an organic solvent for use. Polysilazane is transformed into silica or a silica material when heated, in which the silica material is used for electric and electronic applications, such as an insulating layer, owing to excellent insulating properties thereof.

Polysilazane can be prepared from a variety of starting compounds by various methods. Polysilazane obtained from ammonia is generally known as an ammonolysate, and one obtained from an amino compound containing an NH$_2$ group except for ammonia is known as an aminolysate.

Polysilazane is prepared by a process of reacting chlorosilanes (SiCl$_4$, HSiCl$_3$ and H$_2$SiCl$_2$) with ammonia at high temperature in vapor phase conditions.

U.S. Pat. No. 4,395,460 discloses a method of preparing silazane through a pseudo-ammonolysis process, by which polysilazane is produced by introducing ammonia gas into a chlorodisilane solution dissolved in an inactive solvent.

Korean Patent Publication No. 2007-0040422 is directed to pseudo-ammonolysis products including novel silazane or polysilazane characterized by repeated units of Si—N in a polymeric compound having a reduced number of silicon-hydrogen (Si—H) bonds compared to the number of Si—H bonds in the starting compound. As for the pseudo-ammonolysis products having the Si—H bond, ammonium chloride (NH$_4$Cl) generated during the reaction is dissolved in liquid anhydrous ammonia. The dissolved ammonium chloride acts as a catalyst to promote reaction between Si—H and NH$_3$ to form an Si—NH$_2$ bond. As a result, polysilazane with a reduced Si—H bond is obtained. However, the number of Si—H bonds is significantly reduced in polysilazane, thereby providing an excessive number of ammonia substituents. For polysilazane with the excessive ammonia substituents, an excessive amount of ammonia escapes, causing volume contraction, thereby causing cracks during a process of transforming the polysilazane into a dielectric material of SiO$_2$ via coating a polysilazane solution on a wafer and annealing.

SUMMARY OF THE INVENTION

The present invention is directed to solving the above and other problems of the related art, and an aspect of the present invention is to provide a novel method of preparing polysilazane which can minimize substitution of an Si—H bond by ammonia.

Another aspect of the present invention is to provide a method of preparing polysilazane and a polysilazane solution which can minimize substitution of an Si—H bond of a starting compound using ammonia.

According to an aspect, the invention provides a method of preparing polysilazane using halosilane and liquid anhydrous ammonia including: adding liquid anhydrous ammonia to a solvent in a weight ratio of 0.5:1 to 10:1, followed by stirring to prepare a mixture solution, and allowing pseudo-ammonolysis to be carried out by adding halosilane to the mixture solution separated into two phases.

The solvent may be pyridine and triazine.

The pseudo-ammonolysis may be carried out at −44 to −30° C. for 5 to 24 hours.

According to another aspect, the invention provides a method of preparing a polysilazane solution for a wafer coating including: adding liquid anhydrous ammonia to pyridine maintained at −44 to −30° C. in a weight ratio of 0.5:1 to 10:1, followed by stirring to prepare a mixture solution; allowing reaction between dichlorosilane and the mixture solution for 5 to 24 hours by adding dichlorosilane to the mixture solution when phase separation of the mixture solution is obtained after stirring; removing the liquid anhydrous ammonia and removing pyridine from the mixture solution with a rotary distiller when the reaction is complete; and adding dibutyl ether to the mixture solution, from which pyridine has been removed, to remove remaining pyridine from the mixture solution, followed by filtering reaction products from the mixture solution.

DETAILED DESCRIPTION OF THE INVENTION

The present invention relates to a method of preparing polysilazane which can minimize substitution of an Si—H bond by ammonia in order to decrease cracks which are generated upon coating of a polysilazane solution and, more particularly, to a method of synthesizing polysilazane using a solution which is subjected to phase separation.

Hereinafter, a method of synthesizing polysilazane according to an embodiment of the present invention will be explained in detail.

First, an anhydrous ammonia solution is added to a solvent, which is maintained at a low temperature of −140 to −30° C., preferably at −44 to −33° C., to prepare a mixture solution of a solvent layer and an ammonia layer. A weight ratio of the anhydrous ammonia solution to the solvent may be 0.5:1 to 10:1. If the ratio is less than 0.5:1, a substantial amount of polysilazane is dissolved in the amine layer, thereby lowering yields. If the ratio exceeds 10:1, the ammonia becomes less effective in dissolution of ammonium.

While the low temperature is maintained, halosilane is smoothly added to the mixture solution to allow pseudo-ammonolysis to be carried out. The pseudo-ammonolysis is carried out at −44 to −30° C. for 5 to 24 hours under normal atmospheric pressure (1 atm.). The reaction temperature may be in the range of −44 to −30° C., more preferably −33° C., since pyridine has a solid phase below −44° C. and ammonia has a gas phase above −30° C. If the reaction time is less than 5 hours, the pseudo-ammonolysis will not be completed, and if more than 24 hours, temperature maintenance time and operating time of a reactor will increase, thereby deteriorating cost-efficiency.

In this embodiment, the solvent is not limited to specific kinds as long as it undergoes phase separation from anhydrous ammonia. For example, pyridine, triazine, dimethylamine or diethylamine are used as suitable solvents. Pyridine may be advantageously used as the solvent. Pyridine enables ammonium salts formed during the reaction to be moved to the anhydrous ammonia layer without precipitation.

The pseudo-ammonolysis reaction can be carried out in an organic solvent, such as benzene, toluene, xylene, pentane, tetrahydrofuran or isopropyl ether, which does not interfere with the pseudo-ammonolysis reaction.

Halosilane, used as an Si—H bond-containing starting compound in this embodiment, has at least one Si—H bond. Specifically, examples of suitable halosilane include dichlorosilane, methyl dichlorosilane, ethyl dichlorosilane, ethyl diiodosilane, ethyl difluorosilane, dichloro monofluorosilane, propyl dibromosilane, iso-propyl dichlorosilane, iso-butyl dichlorosilane, iso-amyl dichlorosilane, benzyl dichlorosilane, propenyl dichlorosilane, naphtyl dichlorosilane, phenyl dichlorosilane, diphenyl chlorosilane, methyl ethyl chlorosilane, vinyl methyl chlorosilane, phenyl methyl chlorosilane, dibenzyl chlorosilane, p-chlorophenyl methyl chlorosilane, n-hexyl dichlorosilane, cyclohexyl dichlorosilane, dicyclohexyl chlorosilane, di-isobutyl chlorosilane, p-tolyl dichlorosilane, di-p-tolyl chlorosilane, p-styryl dichlorosilane, ethynyl dichlorosilane, and mixtures thereof.

The halosilane is introduced into the mixture solution of the solvent and the liquid anhydrous ammonia and reacted with anhydrous ammonia. During the pseudo-ammonolysis, the stoichiometric amount of ammonia may be 2-10 times the amount of halosilane. One molecule of ammonia replaces one halogen atom, and another molecule forms an ammonium halide. Thus, an excess of liquid anhydrous ammonia may be used 2-10 times the amount of halosilane.

The pseudo-ammonolysis is an exothermic reaction, and thus it is desirable that halosilane be slowly added to the mixture solution so as not to overheat reactants.

During the pseudo-ammonolysis, polysilazane and ammonium chloride ($NH_4Cl$) are formed. Here, the ammonium chloride moves to the ammonia layer and the polysilazane, that is, an ammonolysis product with an Si—H bond, moves to the solvent layer which is an organic layer.

Since the polysilazane and the ammonium chloride separately move to the organic layer and the ammonia layer, respectively, possibility of contact between Si—H of the polysilazane and the ammonium chloride is minimized. As a result, polysilazane in which an Si—H bond is minimally substituted by ammonia is obtained. Further, although a known method of preparing polysilazane requires several washing processes to remove ammonium salts, the method according to this embodiment can remove ammonium chloride by removing the ammonia layer since the ammonium chloride is separated in the ammonia layer. Therefore, the method according to this embodiment does not require a refining process.

When the pseudo-ammonolysis is completed, the liquid anhydrous ammonia is decanted, and the solvent is removed from the polysilazane in the organic layer. Then, the polysilazane is dissolved in a desired solvent, thereby preparing a polysilazane solution for a wafer. The solvent may be removed using a rotary distiller.

The polysilazane synthesized by this method has a molecular chain having a silazane structure expressed by Chemical Formula 1.

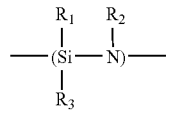

[Chemical Formula 1]

In this formula, $R_1$ to $R_3$ are selected from hydrogen, a hydrocarbon group, or a silyl group having a hydrocarbon group. A hydrocarbon group includes an alkyl group, an alkenyl group, a cycloalkyl group, a cycloalkenyl group, an aryl group, an arylalkyl group, etc. The hydrocarbon group may contain 1 to 20 carbon atoms, but is not limited thereto. A silyl group having a hydrocarbon group may contain 1 to 10 carbon atoms, and more preferably 1 to 6 carbon atoms. Further, 1 to 3 hydrocarbons are bonded to Si.

The polysilazane prepared according to this embodiment may have a chain shape, a ring shape, a cross-linked structure, or a mixture thereof.

Next, the invention will be described in detail with reference to examples. It should be noted that the scope of the present invention is not limited to the following examples.

EXAMPLE 1

500 g of an anhydrous ammonia solution was added to 1 kg of liquid-phase pyridine maintained at −35° C., followed by sufficiently stirring to prepare a mixture solution. Then, the mixture solution was separated into two layers. 50 g of dichlorosilane was gently added to the mixture solution and reacted therewith for 24 hours. Here, temperature was maintained at −35° C. When the reaction was completed, the anhydrous ammonia solution was removed from the mixture solution and about 90% of the pyridine was then removed therefrom using a rotary distiller. Then, about 100 g of dibutyl ether was added to the mixture solution, and pyridine was completely removed from the mixture solution using the rotary distiller. The solution, from which pyridine had been removed, was maintained at −20° C. for 7 days, followed by filtering reaction products from the mixture solution using a 0.2 μm filter, thereby preparing a polysilazane solution.

EXAMPLE 2

The polysilazane solution prepared in Example 1 was coated on a wafer at 1500 rpm and a thickness thereof was measured to be 2200 Å. The wafer was pre-baked at 200° C. for 3 minutes and a thickness thereof was measured to be 1820 Å. Then, the wafer was annealed at 800° C. for 20 minutes and a thickness thereof was measured to be 1603 Å. After the annealing, a thickness loss of the wafer was about 12%. This thickness loss was decreased, as compared with 15% in general polysilazane subjected to the same annealing process.

That is, since substitution of the Si—H bond by ammonia was minimized in polymerizing polysilazane, ammonia was prevented from escaping in an excessive amount during a process of transforming polysilazane to a dielectric material of $SiO_2$ via an annealing process, so that cracking was decreased.

COMPARATIVE EXAMPLE 1

500 g of anhydrous ammonia and 60 g of dichlorosilane were added to a reactor at −33° C. When the reaction was completed, an anhydrous ammonia layer was removed, and a polysilazane layer was obtained. 10 g of the polysilazane was dissolved in 60 g of dibutyl ether, followed by filtration, thereby preparing a polysilazane solution.

COMPARATIVE EXAMPLE 2

The polysilazane solution prepared in Example 2 was coated on a wafer at 1500 rpm and a thickness thereof was measured to be 2200 Å. The wafer was pre-baked at 200° C. for 3 minutes and a thickness thereof was measured to be 1800 Å. Then, the wafer was annealed at 800° C. for 20 minutes and a thickness thereof was measured to be 1505 Å. The thickness loss of the wafer was about 16%.

According to the method of the embodiment of the invention, since substitution of the Si—H bond in polysilazane by ammonia can be minimized, ammonia is prevented from escaping in an excessive amount during a process of transforming polysilazane into a dielectric material of $SiO_2$ in a wafer coating process, thereby decreasing generation of cracks.

What is claimed is:

1. A method of preparing polysilazane using halosilane and liquid anhydrous ammonia, comprising:
    adding liquid anhydrous ammonia to a solvent in a weight ratio of 0.5:1 to 10:1, followed by stirring to prepare a mixture solution, and allowing pseudo-ammonolysis to occur by adding halosilane to the mixture solution separated into two phases.

2. The method according to claim 1, wherein the solvent is pyridine and triazine.

3. The method according to claim 1, wherein the pseudo-ammonolysis is carried out at −44 to −30° C. for 5 to 24 hours.

4. A method of preparing a polysilazane solution for wafer coating comprising:
    adding liquid anhydrous ammonia to pyridine maintained at −44 to −30° C. in a weight ratio of 0.5:1 to 10:1, followed by stirring to prepare a mixture solution;
    allowing reaction between dichlorosilane and the mixture solution for 5 to 24 hours by adding dichlorosilane to the mixture solution to when phase separation of the mixture solution is obtained after stirring;
    removing the liquid anhydrous ammonia and removing pyridine from the mixture solution with a rotary distiller when the reaction is complete; and
    adding dibutyl ether to the mixture solution, from which pyridine has been removed, to remove remaining pyridine from the mixture solution, followed by filtering reaction products from the mixture solution.

* * * * *